(12) United States Patent
Ji et al.

(10) Patent No.: US 11,699,969 B2
(45) Date of Patent: Jul. 11, 2023

(54) COMPRESSOR AND METHOD FOR CONTROLLING THE COMPRESSOR

(71) Applicant: Danfoss (Tianjin) Ltd., Tianjin (CN)

(72) Inventors: Shizhong Ji, Tianjin (CN); Li Yao, Tianjin (CN); Wanzhen Liu, Tianjin (CN)

(73) Assignee: Danfoss (Tianjin) Ltd., Tianjin (CN)

( * ) Notice: Subject to any disclaimer, the term of this patent is extended or adjusted under 35 U.S.C. 154(b) by 0 days.

(21) Appl. No.: 16/942,122

(22) Filed: Jul. 29, 2020

(65) Prior Publication Data
US 2021/0058019 A1   Feb. 25, 2021

(30) Foreign Application Priority Data

Jul. 30, 2019   (CN) .......................... 201910705228.3

(51) Int. Cl.
  *H02P 21/34*   (2016.01)
  *H02P 21/09*   (2016.01)
  *H02P 21/22*   (2016.01)
  *F25B 31/02*   (2006.01)

(52) U.S. Cl.
  CPC ............ *H02P 21/34* (2016.02); *F25B 31/026* (2013.01); *H02P 21/09* (2016.02); *H02P 21/22* (2016.02)

(58) Field of Classification Search
  USPC .................................................. 318/400.02
  See application file for complete search history.

(56) References Cited

U.S. PATENT DOCUMENTS

| 10,042,011 B2 | 8/2018 | Deng | |
|---|---|---|---|
| 2002/0157408 A1* | 10/2002 | Egawa | .................. F25B 49/025 62/228.1 |
| 2015/0188480 A1 | 7/2015 | Liu et al. | |

(Continued)

FOREIGN PATENT DOCUMENTS

| CN | 101770002 A | 7/2010 |
|---|---|---|
| CN | 104300710 A | 1/2015 |

(Continued)

OTHER PUBLICATIONS

JP2008106989 A, Refrigerating Cycle Device Machine translation; Kawachi Mitsuo Tsuchiyama Yoshiro Yoshida Izumi (Year: 2008).*

(Continued)

*Primary Examiner* — Jorge L Carrasquillo
(74) *Attorney, Agent, or Firm* — McCormick, Paulding & Huber PLLC

(57) ABSTRACT

A compressor and a control method thereof are provided. The compressor includes a motor with a rotor of a permanent magnet. According to embodiments, the method of controlling the compressor includes: applying a detection current to the motor in response to a command of starting the compressor; detecting whether there is demagnetization of the permanent magnet of the rotor according to a response of the motor to the applied detection current; resetting an operating parameter of the compressor if there is the demagnetization; and starting the compressor according to the reset operating parameters. According to embodiments of the present disclosure, when the compressor is to be started, demagnetization is detected first, and the operating parameter are set accordingly, so as to suppress or avoid performance degeneration due to the demagnetization.

18 Claims, 4 Drawing Sheets

(56) References Cited

U.S. PATENT DOCUMENTS

2017/0030984 A1* 2/2017 Deng .................... H02M 5/458
2019/0229661 A1* 7/2019 Ogawa ................... H02P 21/10
2020/0144951 A1* 5/2020 Nigo ...................... H02K 1/276

FOREIGN PATENT DOCUMENTS

| | | |
|---|---|---|
| CN | 105021990 A | 11/2015 |
| CN | 106597276 A | 4/2017 |
| CN | 106762587 A | 5/2017 |
| CN | 107294450 A | 10/2017 |
| CN | 107659066 A | 2/2018 |
| CN | 107659235 A | 2/2018 |
| CN | 108206655 A | 6/2018 |
| CN | 108278749 A | 7/2018 |
| DE | 103 42 562 A1 | 4/2005 |
| DE | 11 2014 006 272 T5 | 10/2016 |
| JP | 2011125154 A * | 6/2011 |

OTHER PUBLICATIONS

KR 0162454 B1, Refrigerator Control Apparatus Using a Linear Compressor; Machine translation; Song Kye-Yong (Year: 1999).*
First Examination Report for Indian Patent Application No. 202014032743 dated Mar. 10, 2021.

* cited by examiner

COMPRESSOR AND METHOD FOR CONTROLLING THE COMPRESSOR

CROSS-REFERENCE TO RELATED APPLICATION

This application claims foreign priority benefits under 35 U.S.C. § 119 to Chinese Patent Application No. 201910705228.3 filed on Jul. 30, 2019, the content of which is hereby incorporated by reference in its entirety.

TECHNICAL FIELD

The present disclosure generally relates to the field of compressor control, and more particularly, to a compressor for suppressing performance degeneration due to demagnetization and a method for controlling the compressor.

BACKGROUND

A permanent magnet of a rotor in a compressor may be demagnetized due to various factors, such as overcurrent during operation of the compressor or the rotor rust due to long-term storage. There is usually no detection for the demagnetization of the compressor currently, and the control is still performed under the condition that the compressor has no demagnetization. However, the demagnetization of the permanent magnet of the rotor will cause a change in a control model of the compressor, will reduce control accuracy, will increase current under the same condition, and will make it impossible to output the maximum power.

SUMMARY

In view of the above, the present disclosure aims to provide a compressor capable of suppressing performance degeneration due to demagnetization and a method for controlling the compressor.

One aspect of the present disclosure provides a method for controlling a compressor including a motor with a rotor of a permanent magnet. The method includes: applying a detection current to the motor in response to a command of starting the compressor; detecting whether there is demagnetization of the permanent magnet of the rotor or not according to a response of the motor to the applied detection current; resetting an operating parameter of the compressor if there is the demagnetization; and starting the compressor according to the reset operating parameter. By firstly detecting the demagnetization and resetting the operating parameters accordingly at startup, it is possible to suppress or even avoid the performance degeneration due to the demagnetization.

According to an embodiment of the present disclosure, the detection current may have only a q-axis component, with a d-axis component of zero. In this case, it is relatively easy to determine the parameter of the permanent magnet, and thereby determine whether there is demagnetization or not. For example, a flux linkage of the permanent magnet may be calculated, and the calculated flux linkage of the permanent magnet may be compared with a theoretical value of a flux linkage of the permanent magnet, so as to determine whether there is demagnetization or not.

According to an embodiment of the present disclosure, detecting whether there is demagnetization of the permanent magnet of the rotor or not may further include determining a level of demagnetization, and resetting the operating parameter of the compressor may further include setting the operating parameters based on the determined level of demagnetization. In this way, the operating parameter can match the condition of the permanent magnet better.

According to an embodiment of the present disclosure, when detecting whether there is demagnetization of the permanent magnet of the motor or not, a positional angle of the rotor obtained by integrating a speed of the motor may be used in a control loop of the motor.

According to an embodiment of the present disclosure, the reset operating parameter include at least one of a maximum output current and an overcurrent protection point of a frequency converter which are operable for driving the motor in the compressor. In this way, even if there is demagnetization, it is possible to increase the output current of the frequency converter to meet the requirement of outputting the maximum power, and also to avoid further demagnetization. More particularly, if there is the demagnetization and the level of demagnetization is within a certain range of, for example, 20%, the maximum output current of the frequency converter may increase and the overcurrent protection point may decrease with an increase in the detected level of demagnetization. For example, the maximum output current of the frequency converter may have an upper limit that is about 150% of a rated operating current of the frequency converter, and the overcurrent protection point may have a lower limit that is about 160% of the rated operating current of the frequency converter.

Another aspect of the present disclosure provides a compressor including a motor with a rotor of a permanent magnet and a controller configured to execute a startup algorithm at startup to operate according to the above method.

According to an embodiment of the present disclosure, the compressor may further include an angle generator configured to obtain a positional angle of the rotor by integrating a speed of the motor.

BRIEF DESCRIPTION OF THE ACCOMPANYING DRAWINGS

The above and other objects, features, and advantages of the present disclosure will be more apparent through the following description of embodiments of the present disclosure with reference to the accompanying drawings, in which.

DETAILED DESCRIPTION

Hereinafter, embodiments of the present disclosure will be described with reference to the accompanying drawings. It should be understood, however, that these descriptions are merely exemplary and are not intended to limit the scope of the present disclosure. In addition, in the following description, descriptions of well-known structures and technologies are omitted to avoid unnecessarily obscuring the concepts of the present disclosure.

The terminology used herein is for the purpose of describing specific embodiments only and is not intended to limit the disclosure. The words "a", "an" and "the" as used herein should also include the meaning of "a plurality of" and "multiple" unless the context clearly indicates otherwise. In addition, the terms "including", "comprising" and the like indicate the presence of features, steps, operations, and/or components, but do not exclude the presence or addition of one or more other features, steps, operations, or components.

All terms (including technical and scientific terms) used herein have the meaning commonly understood by those skilled in the art unless otherwise defined. It should be noted that the terms used herein should be interpreted to have meanings consistent with the context of the description and should not be interpreted in an idealized or overly rigid manner.

Figure 4:
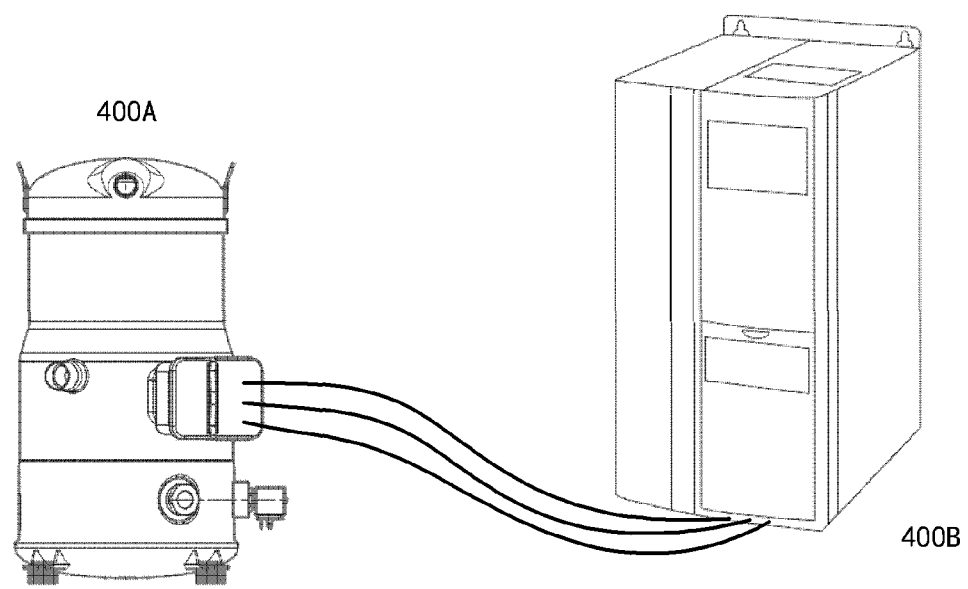
FIG. 4 is a schematic diagram illustrating a compressor and a frequency converter interconnected to each other according to an embodiment of the present disclosure.

FIG. 4 is a schematic diagram illustrating a compressor and a frequency converter interconnected to each other according to an embodiment of the present disclosure.

As shown in FIG. 4, a compressor 400A may be any type of compressors, such as a scroll compressor, a reciprocating compressor, or the like. The compressor 440A may include a shell made of a hard material such as steel and a compressor body provided in the shell, and may have a passage through which a working medium of the compressor 440A flows. The compressor body may include various components, such as a compression mechanism (e.g., a fixed scroll and an orbiting scroll of a scroll compressor) that compresses the working medium flowing thereinto, a driving mechanism (e.g., a motor) that drives movement of the compression mechanism to compress the working medium, and various sensors that monitor operating conditions of the compressor.

A frequency converter 400B may be electrically connected to the compressor 400A through, for example, a cable. For instance, the frequency converter 400B may receive outputs from the various sensors in the compressor 400A, and control the driving of the motor in the compressor 400A based on the outputs of these sensors. In this regard, the frequency converter 400B may be referred to as a "controller" of the compressor 400A.

Although the compressor 400A and the frequency converter 400B are shown in FIG. 4 as separate devices connected through the cable, the present disclosure is not limited to this. For example, the compressor 400A and the frequency converter 400B (and possibly other components) may be integrated in the same system, for example, installed in the same shell, thereby forming a compressor system (also referred to simply as a "compressor").

Figure 1:
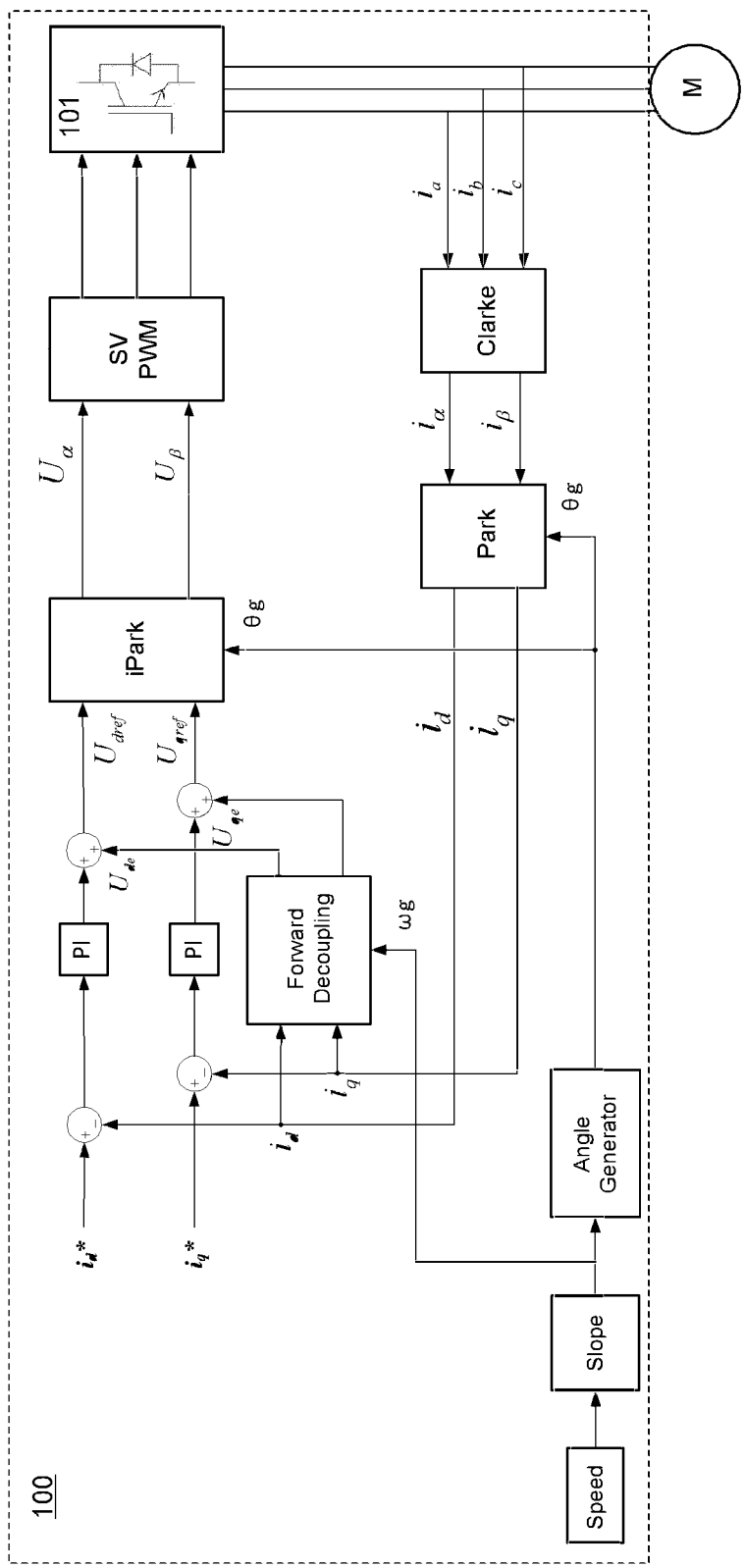
FIG. 1 is a schematic block diagram illustrating a control loop of a compressor according to an embodiment of the present disclosure.

FIG. 1 is a schematic block diagram illustrating a control loop of a compressor according to an embodiment of the present disclosure. The control loop 100 may be implemented in, for example, the frequency converter 400B shown in FIG. 4 to control the compressor 400A, especially the motor therein (see M in FIG. 1).

In FIG. 1, the control loop 100 of the compressor is described by taking a field-oriented control (FOC) of a permanent magnet synchronous motor (PMSM) as an example. However, the present disclosure is not limited to this. The technology of the present disclosure is applicable to other motors with a rotor of a permanent magnet and other control methods of motors.

A frequency converter connected to the compressor, more specifically a current detector in the frequency converter, may sample three-phase current values $i_a$, $i_b$ and $i_c$ (in a three-phase stator coordinate system, i.e., an a-b-c coordinate system) in the motor M. The sampled current values may be converted by a Clarke transformation module to two-phase coordinates $i_\alpha$ and $i_\beta$ (in a two-phase stationary coordinate system, i.e., a α-β coordinate system), and then converted by a Park transformation module into a two-phase rotating coordinate system (a rotor coordinate system, i.e., a d-q coordinate system), resulting in a d-axis current $i_d$ and a q-axis current $i_q$ (these are current feedback values). In the d-q coordinate system, the d-axis may represent an axis of a flux linkage of the rotor (for the synchronous motor, it may be an axis of a magnetic pole of the rotor), and the q-axis may lead the d-axis by 90° counterclockwise. More particularly, the d-axis may correspond to a torque generated by the excitation, and the q-axis may correspond to a torque generated by the permanent magnet. The d-axis and the q-axis can rotate in space at an angular speed of the rotor.

A closed-loop control may be performed based on the current feedback values $i_d$ and $i_q$ together with current command values $i_d^*$ and $i_q^*$ from the frequency converters ($\sqrt{i_d^{*2}+i_q^{*2}} \le i_{max}$, wherein $i_{max}$ represents a maximum output current of the frequency converter), so as to control the current of the motor at a constant current. For example, the current command values $i_d^*$ and $i_q^*$ may be calculated with respect to the current feedback values $i_d$ and $i_q$ to obtain deviation values, which are converted to voltage values by PI (proportional integral) modules. To achieve more accurate control, a feedforward decoupling module may be used to obtain voltage estimates $U_{de}$ and $U_{qe}$ based on the current feedback values $i_d$ and $i_q$ through a voltage model equation of the motor of the permanent magnet. The voltage values obtained by the PI module are calculated with respect to the voltage estimates $U_{de}$ and $U_{qe}$ to obtain voltage command values $U_{dref}$ and $U_{qref}$, from which voltage command values $U_\alpha$ and $U_\beta$, in the two-phase stationary coordinate system can be obtained by an inverse Park transformation module. A space vector pulse width modulation (SVPWM) module may calculate a space vector based on the voltage command values $U_\alpha$ and $U_\beta$, and generate pulse width modulation (PWM) signals. The PWM signals may be applied to switching devices 101 in the frequency converter, enabling the switching devices to switch on and off according to the control command from the controller, thereby applying a desired voltage to the motor M. While applying the voltage to the motor M, the frequency converter may sample the current of the motor M at a switching frequency (usually 2 KHz-16 KHz) for the calculation in the next cycle.

In the above control loop, a positional angle $\theta_g$ of the rotor of the motor need be used in the Park transformation module and the inverse Park transformation module. During the normal operation of the compressor, the positional angle $\theta_g$ can be obtained by a position encoder or an angle observer.

According to embodiments of the present disclosure, demagnetization may be detected in a startup stage of the compressor. During detection of the demagnetization, the positional angle of the rotor may be obtained by speed integration, see "speed", "ramp" and "angle generator" modules in FIG. 1. For example, the speed module may receive settings for the speed, such as user input from outside. The ramp module may generate an output that rises to the set speed at a certain slope (such as 1 Hz/s) (which simulates acceleration of the motor in the startup stage). The angle generator may integrate output of the ramp module (over time) to obtain the positional angle of the motor.

Figure 2:
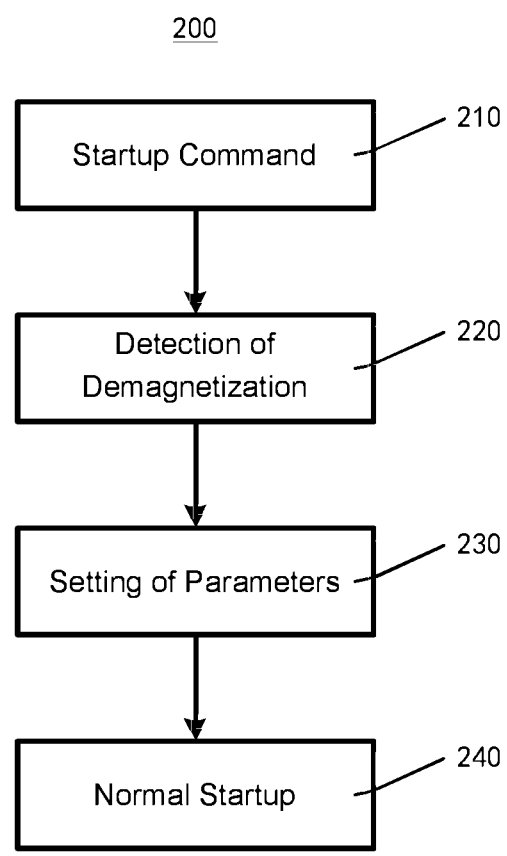
FIG. 2 is a schematic flowchart illustrating a method of controlling a compressor according to an embodiment of the present disclosure.

FIG. 2 is a schematic flowchart illustrating a method of controlling a compressor according to an embodiment of the present disclosure.

As shown in FIG. 2, the compressor control method 200 according to the embodiment of the present disclosure is mainly directed to the startup stage of the compressor. Unlike the conventional technology in which the compressor is started based on normal conditions of the compressor in response to a startup command, the embodiment of the present disclosure detects demagnetization before the normal startup, and then, in response to a demagnetization detection result, sets an operating parameter of the compressor accordingly, such as a maximum output current and/or an overcurrent protection point of a frequency converter for driving a motor in the compressor.

Specially, in step 210, the compressor receives a startup command. For example, the compressor receives the startup command in response to power on.

In step 220, the compressor may detect demagnetization in response to the startup command.

The motor may essentially be equivalent to a circuit model, and there are several such equivalent circuit models in the this field. A parameter about a rotor of a permanent magnet (e.g., a flux linkage thereof) may be calculated with such an equivalent circuit model, so as to determine the demagnetization condition of the permanent magnet. In order to determine the status of the permanent magnet at startup, a certain excitation may be applied to the motor. For example, the excitation may be a detection current or a detection voltage, and then a response of the motor to the excitation is detected. For example, when the applied excitation is a detection current, the response of the motor to the excitation may be a voltage in the motor, that is, the voltage in the motor can be detected in this case. On the other hand, when the applied excitation is a detection voltage, the response of the motor to the excitation may be a current in the motor, that is, the current in the motor can be detected in this case. With the excitation-response, relevant parameters of the rotor of the permanent magnet at this time, such as a level of demagnetization or a back EMF value of the permanent magnet of the rotor, may be calculated based on the equivalent circuit model of the motor.

According to embodiments of the present application, a back EMF detection algorithm can be used. For ease of calculation, the detection current may be set to have a q-axis component only, with a d-axis component as zero, that is, $i_{d\ detection}^* = 0$, $i_{q\ detection}^* = i_{start}$, where the subscript "detection" indicates that this is used in the stage of detecting demagnetization at startup. In other words, the excitation current is zero, and the stator current is all used to generate an electromagnetic torque. $i_{start}$ may be a predetermined percentage, e.g., about 60%, of a rated operating current of the compressor. For example, $i_{d\ detection}^*$ and $i_{q\ detection}^*$ may be output from the frequency converter to the control loop shown in FIG. 1. With the closed-loop control described above, the motor M can be dragged to a predetermined speed corresponding to $i_{start}$.

After the operation of the motor M is stabilized, the flux linkage of the permanent magnet can be calculated by the equivalent circuit model of the motor, thereby determining whether there is demagnetization or not, and determining a level of the demagnetization if there is the demagnetization.

The following Equation (1) shows the equivalent circuit model of the permanent magnet synchronous motor in the d-q coordinate system.

$$\begin{cases} u_q = R_s i_q + L_q \frac{di_q}{dt} + \omega_r L_d i_d + \omega_r \psi_f \\ u_d = R_s i_d + L_d \frac{di_d}{dt} - \omega_r L_q i_q \end{cases} \quad (1)$$

Where, $u_d$ and $u_q$ are respectively d-axis and q-axis components of a stator voltage, $i_d$ and $i_q$ are respectively d-axis and q-axis components of a stator current, $L_d$ and $L_q$ are respectively d-axis and q-axis inductances of stator winding, $R_s$ is a stator resistance, $\omega_r$ is a rotation speed of the rotor, $\psi_r$ is the flux linkage generated by the permanent magnet of the rotor, and dx/dt represents a time differential of x.

By ignoring the stator resistance and taking only the stable status into consideration (it should be noted that the d-axis current may be zero in detecting the demagnetization, as described above), Equation (1) can be simplified to the following Equation (2).

$$\begin{cases} u_q = \omega_r \psi_f \\ u_d = -\omega_r L_q i_q \end{cases} \quad (2)$$

It can be seen from Equation (2) that the q-axis voltage $u_q$ is relevant to the rotation speed $\omega_r$ and the flux linkage $\omega_r$ of the permanent magnet. The frequency converter can calculate the current flux linkage $\psi_r$ of the permanent magnet of the compressor based on the q-axis voltage $u_q$ and the rotation speed $\omega_r$. The calculated value may be compared to a theorical value of the flux linkage (a rated flux linkage of the permanent magnet as if without demagnetization), to determine whether there is demagnetization of the permanent magnet or not, and to determine the level of the demagnetization if yes.

Figure 3:
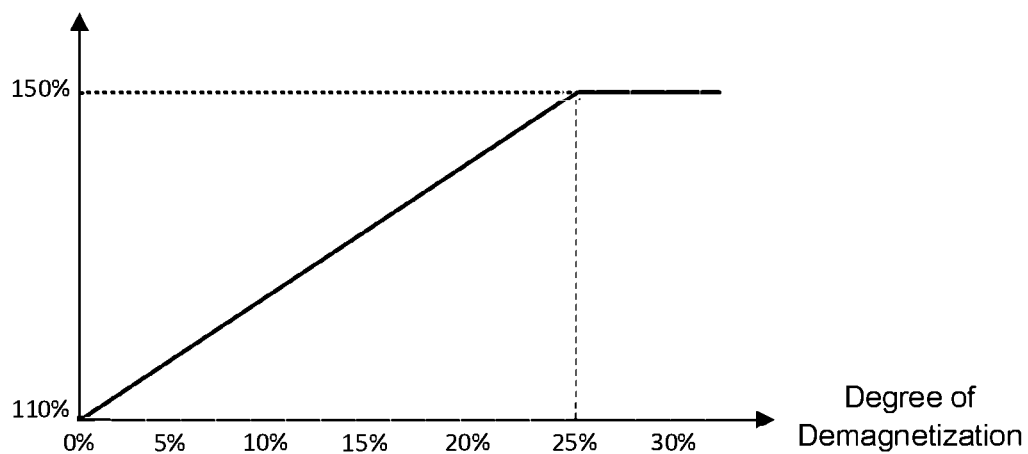
FIG. 3 is a schematic diagram illustrating setting an operating parameter based on a demagnetization level according to an embodiment of the present disclosure.
Figure 3:
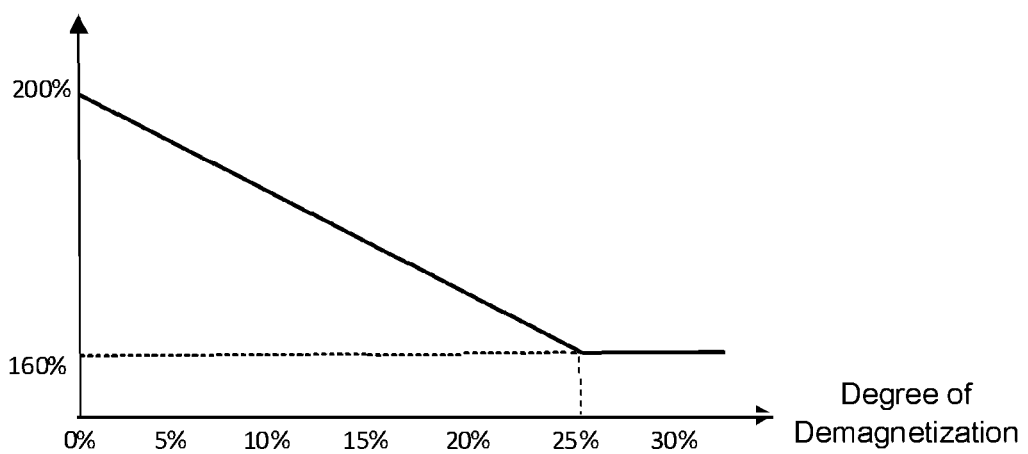

In step 230, at least some operating parameters of the compressor may be reset based on the demagnetization detection result. The reset operating parameters may include parameters that need be adjusted adaptively based on the level of demagnetization, for example, at least one of the maximum output current and the overcurrent protection point of the frequency converter. For example, in the case of demagnetization, the maximum output current of the frequency converter may be increased appropriately. If the level of demagnetization is within a certain range of, for example, 20%, the maximum output current of the frequency converter may be increased gradually as the level of demagnetization increases to meet the requirement of outputting the maximum power. The maximum output current of the frequency converter may have an upper limit, for example, about 150% of the rated operating current of the frequency converter. Therefore, if the level of demagnetization is relatively large, there will be a power limit. In addition, in the case of demagnetization, the overcurrent protection point may be reduced appropriately. If the level of demagnetization is within a certain range of, for example, 20%, the overcurrent protection point may be reduced gradually as the level of demagnetization increases to prevent the demagnetized compressor from being demagnetized further by the excessive overcurrent point. The overcurrent protection point may have a lower limit, for example, about 160% of the rated operating current of the frequency converter. FIG. 3 is a schematic diagram illustrating setting the operating parameters based on the level of demagnetization according to embodiments of the present disclosure.

In step 240, the compressor may be started based on the reset operating parameters.

According to embodiments of the present disclosure, the detection of demagnetization may be performed before the compressor is started normally. In this way, the demagnetization can be discovered in time, and the relevant operating parameters of the compressor can be set accordingly based on the level of demagnetization, which ensures in advance the output of the maximum power without derating on the premise of not damaging the compressor, and also prevents the compressor from being demagnetized further.

As described above, in the detection of demagnetization, the positional angle of the rotor is obtained by integrating the speed, and it is not a real positional angle. When the compressor is operating normally, the positional angle may be obtained by, for example, a position encoder or an angle observer. Therefore, a switching mechanism may be provided in the compressor, so as to switch the provision of the positional angle. More particularly, in the stage of detecting the demagnetization, the angle generated from the angle generator may be provided to the Park transformation module and the inverse Park transformation module (and other modules that require the positional angle); in the stage of the normal operation, the positional angle provided from the position encoder or the angle observer may be provided to the Park transformation module or the inverse Park transformation module (and other modules that require the positional angle).

The above compressor control method 200 may be performed by the controller (for example, the frequency converter 400B shown in FIG. 4) of the compressor. For example, the controller may include a memory device in which instruction codes for executing the compressor control method 200 are stored. At start-up, the controller may run these instructions codes and perform the compressor control method 200 accordingly.

The embodiments of the present disclosure have been described above. However, these embodiments are for illustrative purposes only, and are not intended to limit the scope of the present disclosure. Although the embodiments have been described separately above, this does not mean that measures in the respective embodiments cannot be used in combination to advantage. The scope of the present disclosure is defined by the appended claims and their equivalents. Without departing from the scope of the present disclosure, those skilled in the art can make various substitutions and modifications, and these substitutions and modifications should all fall within the scope of the present disclosure.

What is claimed:

1. A method of controlling a variable-speed compressor comprising a motor with a rotor of a permanent magnet, the method comprising:
    applying a detection current to the motor in response to a command of starting the compressor;
    detecting, according to a response of the motor to the detection current, whether there is demagnetization of the permanent magnet of the rotor;
    resetting an operating parameter of the compressor if there is the demagnetization; and
    starting the compressor according to the reset operating parameter;
    wherein the detection current has a q-axis component, with a d-axis component of zero, and the detection current is a predetermined percentage of a rated operating current of the compressor;
    wherein detecting whether there is demagnetization of the permanent magnet of the rotor comprises: determining a level of demagnetization; and
    wherein resetting an operating parameter of the compressor comprises: setting the operating parameter according to the level of demagnetization.

2. The method according to claim 1, wherein the detection current is around 60% of the rated operating current of the compressor.

3. The method according to claim 2, wherein detecting whether there is demagnetization of the permanent magnet of the rotor comprises:
    calculating a flux linkage of the permanent magnet; and
    comparing the calculated flux linkage of the permanent magnet with a theoretical value of a flux linkage of the permanent magnet to determine whether there is the demagnetization or not.

4. A compressor, comprising:
    a compression mechanism, configured to compress working medium entering the compressor;
    a motor with a rotor of a permanent magnet, configured to drive the compression mechanism to compress the working medium; and
    a controller, configured to execute a startup algorithm at startup to operate according to the method of claim 3.

5. A compressor, comprising:
    a compression mechanism, configured to compress working medium entering the compressor;
    a motor with a rotor of a permanent magnet, configured to drive the compression mechanism to compress the working medium; and
    a controller, configured to execute a startup algorithm at startup to operate according to the method of claim 2.

6. The method according to claim 1, wherein a positional angle of the rotor obtained by integrating a speed of the motor is used in a control loop of the motor when detecting whether there is demagnetization of the permanent magnet of the motor.

7. The method according to claim 1, wherein the operating parameter reset comprise at least one of a maximum output current and an overcurrent protection point of a frequency converter which are operable for driving the motor in the compressor.

8. The method according to claim 7, wherein said resetting the operating parameter of the compressor if there is the demagnetization comprises:
    if there is the demagnetization and a level of the demagnetization is within 20%, increasing the maximum output current of the frequency converter and decreasing the overcurrent protection point with an increase in the level of the demagnetization.

9. The method according to claim 8, wherein the maximum output current of the frequency converter has an upper limit that is 150% of a rated operating current of the frequency converter, and the overcurrent protection point has a lower limit that is 160% of the rated operating current of the frequency converter.

10. A compressor, comprising:
    a compression mechanism, configured to compress working medium entering the compressor;
    a motor with a rotor of a permanent magnet, configured to drive the compression mechanism to compress the working medium; and
    a controller, configured to execute a startup algorithm at startup to operate according to the method of claim 1.

11. The compressor according to claim 10, further comprising an angle generator configured to obtain a positional angle of the rotor by integrating a speed of the motor.

12. The compressor according to claim 10, wherein the detection current has a q-axis component, with a d-axis component of zero.

13. The method according to claim 10, wherein the controller is further configured to detect whether there is demagnetization of the permanent magnet of the rotor by way of:
calculating a flux linkage of the permanent magnet; and
comparing the calculated flux linkage of the permanent magnet with a theoretical value of a flux linkage of the permanent magnet to determine whether there is the demagnetization or not.

14. The method according to claim 10, wherein the controller is further configured to determine a level of demagnetization, and to set the operating parameter according to the level of demagnetization.

15. The method according to claim 10, wherein the operating parameter reset comprise at least one of a maximum output current and an overcurrent protection point of a frequency converter which are operable for driving the motor in the compressor.

16. The method according to claim 15, wherein the controller is configured to:
increase the maximum output current of the frequency converter and decrease the overcurrent protection point with an increase in the level of the demagnetization if there is the demagnetization and a level of the demagnetization is within 20%.

17. The method according to claim 16, wherein the maximum output current of the frequency converter has an upper limit that is 150% of a rated operating current of the frequency converter, and the overcurrent protection point has a lower limit that is 160% of the rated operating current of the frequency converter.

18. The compressor according to claim 10, wherein the compressor is a variable-speed compressor and the variable speed compressor comprises a frequency converter.

* * * * *